(12) United States Patent
Bi et al.

(10) Patent No.: US 7,906,188 B2
(45) Date of Patent: Mar. 15, 2011

(54) POROUS SILICA COATED INKJET RECORDING MATERIAL

(75) Inventors: Yubai Bi, San Diego, CA (US); Sandeep Bangaru, San Diego, CA (US); Fredrick Makau, San Diego, CA (US); Yves-Michel Tricot, Marly (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 1542 days.

(21) Appl. No.: 11/257,960

(22) Filed: Oct. 24, 2005

(65) Prior Publication Data

US 2006/0062941 A1    Mar. 23, 2006

Related U.S. Application Data

(63) Continuation-in-part of application No. 10/769,385, filed on Jan. 30, 2004, now Pat. No. 7,435,450.

(51) Int. Cl.
*B41M 5/40* (2006.01)
(52) U.S. Cl. .................................. 428/32.34; 427/402
(58) Field of Classification Search .................. None
See application file for complete search history.

(56) References Cited

U.S. PATENT DOCUMENTS

| | | | |
|---|---|---|---|
| 3,007,878 A * | 11/1961 | Alexander et al. ............. 516/80 |
| 5,264,275 A | 11/1993 | Misuda et al. |
| 5,275,867 A | 1/1994 | Misuda et al. |
| 5,372,884 A | 12/1994 | Abe et al. |
| 5,463,178 A | 10/1995 | Suzuki et al. |
| 5,612,281 A | 3/1997 | Kobayashi et al. |
| 5,873,934 A | 2/1999 | Kunii et al. |
| 5,965,244 A | 10/1999 | Tang et al. |
| 5,965,252 A | 10/1999 | Santo et al. |
| 6,129,785 A * | 10/2000 | Schliesman et al. .......... 106/482 |
| 6,183,844 B1 | 2/2001 | Li |
| 6,203,899 B1 * | 3/2001 | Hirose et al. ............... 428/32.25 |
| 6,238,784 B1 | 5/2001 | Mochizuki et al. |
| 2003/0181566 A1 | 9/2003 | Chapman et al. |
| 2003/0198759 A1 * | 10/2003 | Fruge et al. .................. 428/32.1 |
| 2004/0003754 A1 | 1/2004 | Ishibashi et al. |
| 2004/0197498 A1 * | 10/2004 | Bi et al. ..................... 428/32.34 |
| 2005/0170109 A1 | 8/2005 | Chen |

FOREIGN PATENT DOCUMENTS

| | | |
|---|---|---|
| EP | 1 464 511 A | 10/2004 |
| EP | 1 559 750 A | 8/2005 |
| GB | 1 342 787 A | 1/1974 |
| WO | WO 2006/040304 A | 4/2006 |
| WO | WO 2006/044106 A | 4/2006 |
| WO | WO 2007/019033 A | 2/2007 |

* cited by examiner

*Primary Examiner* — D. Lawrence Tarazano
*Assistant Examiner* — Gregory Clark

(57) ABSTRACT

A method of treating silica in an aqueous environment includes dispersing silica particulates in an aqueous environment to form an aqueous dispersion, reversing a net charge of a surface of the silica particulates from negative to positive using an inorganic treating agent to form surface-activated silica particulates, and contacting the surface-activated silica particulates with monoaminoorganosilane reagents to form reagent-modified and surface-activated silica particulates.

6 Claims, 2 Drawing Sheets

POROUS SILICA COATED INKJET RECORDING MATERIAL

RELATED APPLICATIONS

The present application is a continuation-in-part of application Ser. No. 10/769,385, filed on Jan. 30, 2004, now U.S. Pat. No. 7,435,450, entitled Surface Modification of Silica in an Aqueous Environment, which is incorporated by reference herein in its entirety.

BACKGROUND

Inkjet printing has become a popular way of recording images on various media surfaces, particularly paper, for a number of reasons, including, low printer noise, capability of high-speed recording, and multi-color recording. Additionally, these advantages of inkjet printing can be obtained at a relatively low price to consumers. While there has been great improvement in inkjet printing, improvements are followed by increased demands from consumers for higher speeds, higher resolution, full color image formation, increased stability, etc.

In recent years, as digital cameras and other digital image collecting devices have advanced, image recording technology has attempted to keep pace by improving inkjet image recording on paper sheets and the like. The desired quality level of the inkjet recorded images ("hard copy") is that of traditional silver halide photography. In other words, consumers would like inkjet recorded images that have the color reproduction, image density, gloss, permanence, durability etc. that is as close to those of silver halide photography as possible.

Traditional recording sheets for the inkjet printing process are not adequate to provide silver halide quality images. Particularly, there is a need to improve ink absorptiveness, ink absorption rate, gloss, image quality, water fastness, and light stability. Additionally, a number of image forming issues related to image quality may arise due to the varying interaction between dye and pigment based inks used in the inkjet printing processes and the receptive media they are printed on. More specifically, dye in dye based ink will penetrate in a receptive media absorbing layer while pigment in pigment based ink will stay on media surface. Consequently, porous media designed for dye based ink provides good image quality for dye based images, but often generates poor gloss and poor gloss uniformity for pigment based inks. Conversely, porous media designed for pigment based ink, optimized for gloss and gloss uniformity, often results in lower color density, poor stacking bleed, and hue shift for dye based printing.

SUMMARY

In one aspect of the present system and method, an ink receiving substrate includes a photobase layer, and silica pigments which are at least duo-treated with both an inorganic treating agent and a monoaminoorganosilane treating agent.

In another embodiment, a method for forming an ink receiving substrate includes providing a photobase layer and dispensing a layer of silica pigments on the photobase layer, wherein the silica pigments are at least duo-treated with both an organic treating agent and a monoaminoorganosilane treating agent.

BRIEF DESCRIPTION OF THE DRAWINGS

The accompanying drawing illustrates various embodiments of the present system and method and is a part of the specification. The illustrated embodiments are merely examples of the present system and method and do not limit the scope thereof.

Throughout the drawings, identical reference numbers designate similar, but not necessarily identical, elements.

DETAILED DESCRIPTION

Figure 1:
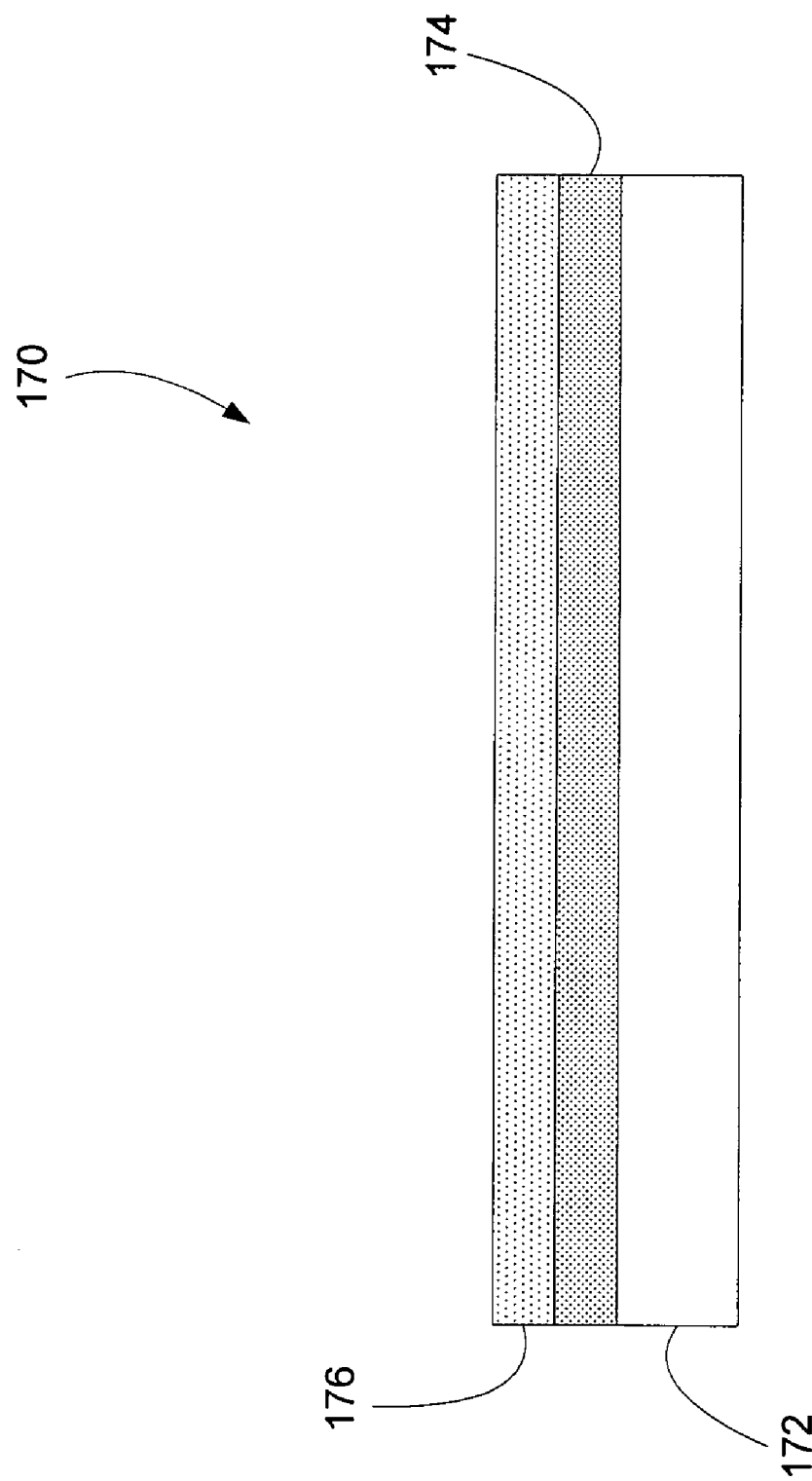
FIG. 1 is a side cross-sectional view illustrating the layers of a porous inkjet recording substrate, according to one exemplary embodiment.

The present specification discloses an exemplary porous ink recording material having improved image quality. According to one exemplary embodiment disclosed herein, the porous ink recording material includes a thin layer of silica pigments which were duo-treated with both an inorganic treating agent such as aluminum chlorohydrate and at least one monoaminoorganosilane treating agent to improve image gloss and quality on prints with both dye and pigment based ink, improve humid bleed and reduce blurry bleed, improve permanence, decrease yellowing, while decreasing manufacturing cost. Further details of the present ink recording material will be provided below.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

As used in the present specification and in the appended claims, the term "liquid vehicle" is defined to include liquid compositions that can be used to carry colorants, including pigments, to a substrate. Liquid vehicles are well known in the art, and a wide variety of liquid vehicle components may be used in accordance with embodiments of the present exemplary system and method. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, binders, plasticizers, salts, etc.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for producing an exemplary porous ink recording material having improved image quality. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure and Composition

FIG. 1 illustrates an exemplary ink receiving substrate (170) configured to receive an inkjet ink with enhanced image quality, according to one exemplary embodiment. As shown in FIG. 1, the present exemplary ink receiving substrate (170) includes a photobase layer (172), a layer of silica pigments which have been duo-treated with both an inorganic treating agent and at least one monoaminoorganosilane treating agent (174), and a top gloss enhancement layer (176). As a result of the present formulation, the disclosed ink receiving substrate (170) improves image gloss and quality, improves humid bleed, improves image permanence, eliminates paper yellowing, and enables a single media to be used for both dye based ink and pigment based ink. The individual components of the present ink receiving substrate (170) will be described in further detail below.

Photobase Paper

The present exemplary ink receiving substrate (170) is formed on a photobase layer (172) or support. According to one exemplary embodiment, the present exemplary photobase layer (172) comprises any printable surface. More particularly, according to one exemplary embodiment, the exemplary photobase layer (172) comprises a photobase material including a highly sized paper extruded with a layer of polyethylene on both sides. According to this exemplary embodiment, the exemplary photobase layer (172) is an opaque water resistant material exhibiting the feel and weight of silver halide paper.

Alternatively, any number of photobase supports used in the manufacture of transparent or opaque photographic material may also be employed as the photobase layer (172) of the present system and method. Examples include, but are not limited to, clear films, such a cellulose esters, including cellulose triacetate, cellulose acetate, cellulose propionate, or cellulose acetate butyrate, polyesters, including poly(ethylene terephthalate), polyimides, polycarbonates, polyamides, polyolefins, poly(vinyl acetals), polyethers, polyvinyl chloride, and polysulfonamides. Polyester film supports, and especially poly(ethylene terephthalate), such as manufactured by du Pont de Nemours under the trade designation of MELINEX, may be selected because of their excellent dimensional stability characteristics. Further, opaque photographic materials may be used as the photobase layer (172) including, but in no way limited to, baryta paper, polyethylene-coated papers, and voided polyester.

Further, non-photographic materials, such as transparent films for overhead projectors, may also be used as the photobase layer (172). Examples of such transparent films include, but are not limited to, polyesters, diacetates, triacetates, polystyrenes, polyethylenes, polycarbonates, polymethacrylates, cellophane, celluloid, polyvinyl chlorides, polyvinylidene chlorides, polysulfones, and polyimides.

Additional support materials that may be incorporated by the present system and method to serve as the photobase layer (172) include plain paper of various different types, including, but in no way limited to, pigmented papers and cast-coated papers, as well as metal foils, such as foils made from alumina.

Silica Pigment Coating

As illustrated in FIG. 1, the photobase layer (172) is coated on at least one surface with a silica pigment coating that has been duo-treated with both an inorganic treating agent and monoaminoorganosilane treating agent (174). Accordingly, the silica pigment coating includes a number of components including, but in no way limited to, a cationic pigment, a binder, surfactants, plasticizers, and a binder cross-linker. Further details of the silica pigment coating components will be described in further detail below.

As mentioned, the present silica pigment coating (174) includes a cationic pigment. According to one exemplary embodiment, the cationic pigment comprises a stable dispersion of fumed silica with its surface modified by an inorganic treating agent and a monoaminoorganosilane treating agent. According to this exemplary embodiment, the fumed silica may be any silica powder with a broad range of surface area and particle size. Specifically, according to one exemplary embodiment, the aggregate size of the fumed silica is between approximately 50 to 1000 nm in size. More specifically, the fumed silica is preferred between approximately 100 to 500 nm in size. The Brunauer-Emmett-Teller (BET) surface area of the fumed silica is between approximately 100 to 350 square meters per gram. More specifically, the fumed silica is preferred to have a BET surface area of 150 to 300 square meters per gram. Accordingly, the zeta potential, or the electrokinetic measurement used to control the stability of a colloid, of the organic treated silica at a pH of 4.5 is at least 30 mV. Further, according to one exemplary embodiment, the present silica pigment coating comprises between approximately 10 wt % and 40 wt % fumed silica particulates.

As mentioned, the fumed silica has its surface modified by an inorganic treating agent and a monoaminoorganosilane treating agent. The inorganic treating agent provides an inorganic means of adding positive surface charge to the silica; a more organic grouping can also be added to provide increased positive charge or provide active ligand functionality. According to one exemplary embodiment, the inorganic treating agent may include, but is in no way limited to, aluminum chloride hydrate (ACH). As used herein, "aluminum chloride hydrate," "ACH," "polyaluminum chloride," "PAC," "polyaluminum hydroxychloride," and the like, refers to a class of soluble aluminum products in which aluminum chloride has been at least partly reacted with a base. The relative amount of OH—, compared to the amount of Al, can determine the basicity of a particular product. The chemistry of ACH is often expressed in the form $Al_n(OH)_mCl_{(3n-m)}$, wherein n can vary from 1 to 50, and m may vary from 1 to 150. An exemplary stable ionic species in ACH can have the formula $[Al_{12}(OH)_{24}AlO_4(H_2O)_{12}]^{7+}$. Other examples of acceptable inorganic treatment agents such as aluminum chlorohydrate include, but are in no way limited to, $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc. Examples of the above mentioned aluminum chlorohydrate (ACH) may be commercially found under the names Aloxicoll, Aluminol ACH, Aquarhone, Cartafix LA, Ekoflock 90, GenPac 4370, Gilufloc 83, Hessidrex WT, HPB 5025, Hydral, Hydrofugal, Hyper Ion 1026, Hyperdrol, Kempac 10, Kempac 20, Kemwater PAX 14, Locron, Locron P, Locron S, Nalco 8676, Prodefloc, and Sulzfloc JG.

According to one exemplary embodiment, the molar ratio of ACH relative to silica in the present formulation is between approximately 0.5 to 5.0%. According to a more specific exemplary embodiment, the molar ratio of ACH relative to silica is between approximately 0.8 and 2.0%.

In addition to the above-mentioned inorganic treating agent, the fumed silica has its surface modified by a monoaminoorganosilane treating agent. According to one exemplary embodiment, the added monoaminoorganosilane treating agent performs at least two functions in the present silica pigment coating. Specifically, the added monoaminoorganosilane treating agent works as a base to neutralized the above-mentioned ACH and increases the pH of the silica pigment coating. Additionally, according to this exemplary embodiment, if monoaminoorganosilane is used to neutralize the ACH solution, the monoaminoorganosilane may also be used to add additional positively charged moieties to the surface of the silica. More specifically, the ammonium ion of the monoaminoorganosilane will carry a positive charge. According to this exemplary embodiment, the monoaminoorgaonosilane is bonded to the silica surface; accordingly the positive charge on the ammonium will be used to stabilized the silica dispersion by increasing the zeta potential of the silica particles. Consequently, the monoaminoorganosilane is also used to modify the silica surface, thereby increasing the stability of the resulting dispersion.

Furthermore, according to one alternative embodiment, the monoaminoorganosilane reagent can be added to the surface-activated silica to provide another desired function at or near the surface, e.g., ultraviolet absorber, chelating agent, hindered amine light stabilizer, reducing agent, hydrophobic group, ionic group, buffering group, or functionality for a subsequent reaction. According to one exemplary embodiment, the monoaminoorganosilanes may include, but are in no way limited to, 3-aminopropyltriethoxysilane, 3-aminopropyltrimethoxysilane and N-butylaminopropyltrimethoxysilane.

More specifically, according to one exemplary embodiment, the present monoaminoorganosilane treating agent can be a primary amine, a secondary amine, a tertiary amine, and/or a quaternary amine. Diamine and triamine aminoorganosilane treating agents, especially separated by ethylene group, are not incorporated due to a lack of yellowing resistance.

Mono primary aminoorganosilane treating agents that may be incorporated by the present exemplary system and method include, but are in no way limited to, 3-aminopropyltriethoxysilane and 3-aminopropyltrimethoxy-silane.

Non-limiting examples of mono secondary aminooganosilane treating agents include, but are in no way limited to, N-methylaminopropyltrimethoxysilane, N-ethylaminopropyltrimethoxysilane, N-propylaminopropyltrimethoxysilane, or N-butylaminopropyltrimethoxysilane.

Non-limiting examples of mono tertiary aminoorganosilane treating agents include, but are in no way limited to, (N, N-diethyl-3-aminopropyl) trimethoxysilane and (N, N-dimethylaminopropyl) trimethoxysilane. Some of the Mono tertiary such as Bis(2-hydroxyethyl)-3-aminopropyltriethoxysilane, N-(hydroxyethyl) N-methylaminopropyltrimethoxysilane, may have slow dispersing rate and elevated viscosity.

Examples of quaternary aminoorganosiliane treating agents include, but are in no way limited to, N-trimethoxysilylpropyl-N,N,Ntrimethylammonium chloride.

According to one exemplary embodiment, the molar ratio of monoaminoorganosilane relative to silica is from approximately 0.5 to 5%, more preferably between approximately 1.2 and 3%. Additionally, the ratio of ACH and monoaminoorganosilane varies from approximately 1:1 to 1:3 depending on the amine treating agent used. For 3-aminopropyltriethoxysilane, the optimized ratio is from approximately 1:1.5 to 1:3.0, and for N-butylaminopropyltrimethoxysilane, the optimized ratio is from approximately 1:1.0 to 1:2.5. At optimized condition, according to one exemplary embodiment, no free base or acid is added and the pH of the dispersion is from approximately 5.0 to 6.5, preferably at approximately 6.1, and the pH of the coating mix is preferably approximately 5.2 to achieve manufacturability.

The stable dispersion of fumed silica may have its surface modified by the above-mentioned inorganic treating agent and monoaminoorganosilane treating agent according to any number of methods. More specifically, the duo treated silica may be prepared according to, but in no way limited to, one of four exemplary methods.

According to a first exemplary method, an inorganic surface activating agent may be added to water, followed by the addition of the aminoorganosilane treating agent, which is mixed together to form a solution. After the solution is formed, the silica may be added to the solution, portion-wise under agitation, to facilitate its dispersion.

According to a second exemplary embodiment, the aminoorganosilane treating agent may be added to the water first, followed by the inorganic surface activating agent. The components are mixed to form a solution, followed by an addition of the silica, portion-wise and under agitation, to form the duo treated silica.

According to a third exemplary embodiment, the duo treated silica may be formed by adding an inorganic surface activating agent to water prior to the fumed silica, and then adding the fumed silica portion-wise over a period of time. After combining the inorganic surface activating agent and the silica, the monoaminoorganosilane reagent can then be added portion-wise under agitation to form the duo treated silica.

According to yet a fourth exemplary embodiment, the silica can be dispersed in water first, and then the inorganic surface activating agent can be added to the silica dispersion. In one exemplary embodiment, the ACH can be added all at once, or portion-wise, depending on the desired result. In another exemplary embodiment, both the silica and the inorganic surface activating agent, such as ACH, can be added to water simultaneously. After combining the inorganic surface activating agent and the silica, the monoaminoorganosilane reagent can then be added portion-wise under agitation to form the duo treated silica.

In each of the above-mentioned embodiments, the net surface charge of the silica can be converted from negative (−) to positive (+). This does not mean that every negatively charged moiety is necessarily converted from negative to positive, but that the surface charge as a whole becomes more positive than negative. Typically, after combining the inorganic surface activating agent and the silica, the monoaminoorganosilane reagent can then be added, though this order of addition is not required. For example, in one embodiment, after forming the silica/inorganic surface activating agent composition as described above, a monoaminoorganosilane reagent can be added to an inorganic surface activating agent treated silica portion-wise. Such an addition scheme can prevent flocculation of the silica. In this embodiment, the pH can be controlled to maintain the colloidal stability of the silica dispersion. Alternatively, the ACH and the monoaminoorganosilane reagent can be added simultaneously to a silica dispersion. In each of these reaction schemes, little or no organic solvent needs to be used. For example, the aqueous environment can include a predominant amount of water, and can optionally include small amounts of organic solvent, surfactant, crosslinking agent such as boric acid, etc. Further, in some embodiments, it may be desirable to include mordants and/or other additives in the coating composition.

According to the present exemplary embodiment, the above-mentioned duo-treatment neutralized the above-mentioned ACH while increasing the stability of the resulting dispersion, eliminating the need for procedures aimed at reducing the mobile or soluble electrolyte population or ionic species, which may react adversely with pigment colorants in pigment based ink to generate rough surface, or which may act negative with dye in dye base ink to generate lateral migration in humid condition, thereby enabling high gloss with pigment based ink and improved humid fastness for dye based ink. The monoaminoorganosilane treating agents eliminate paper yellowing, which has been observed for di, tri and multiple aminoorganonosilane treating agents, decrease humid bleed and increase the dye based ink color gamut, and also enable smooth manufacturing of this porous coating formulation.

Additionally, the present duo-treatment eliminates the yellowing caused by diamino, triamino, and multiple aminoorganosilane treating agents. More specifically, silica pigment coatings treated with traditional duo-treatments incorporating diamino, triamino, and multiple aminoorganosilane treating agents tend to yellow under hot and humid conditions due to the high level of amines in the coatings. Further, the duo-treatment decreases bleed in the resulting media both in humid conditions and stacking condition conditions due to a reduction in pigment migration. Moreover, the present duo-treatment generates an image receiving layer on which printed pigment image has better handle ability, increased scratch resistance, delivers high chroma even with dye based ink, and provides the advantages of porous inkjet receiving layers such as instant dry-time and durability.

In addition to the above-mentioned inorganic treating agent and monoaminoorganosilane treating agent, the present silica pigment coating (174) may include a number of binder/cross-linkers, surfactants, and/or plasticizers. According to the present exemplary embodiment, the binder/silica ratio is from approximately 10 to 30 parts based on silica or alumina. Appropriate binders for the treated silica include, but are in no way limited to, polyvinylalcohol (PVA) with % hydrolysis from approximately 70 to 99%, derivatized polyvinylalcohol (cationic, acetoacetylated, etc.), copolymer of polyvinylalcohol and poly(ethylene oxide), gelatin, polyvinylpyrrolidone, low Tg synthetic polymer latex, and mixtures thereof.

In addition to the above-mentioned components, the silica pigment coating (174) may also contain any number of surfactants, buffers, plasticizers, and other additives that are well known in the art.

During application, the silica pigment coating (174) can be coated onto the photobase layer (172) by any number of material dispensing machines and/or methods including, but in no way limited to, a slot coater, a curtain coater, a cascade coater, a blade coater, a rod coater, a gravure coater, a Mylar rod coater, a wired coater, and the like. According to one exemplary embodiment, the silica pigment coating (174) may be coated between approximately 15 gsm to 40 gsm to form a layer having a thickness between approximately 15 and 50 µm.

Gloss Enhancement Layer

As illustrated in FIG. 1, the silica pigment coating that has been duo-treated with both an inorganic treating agent and monoaminoorganosilane treating agent (174) is coated with a top gloss enhancement layer (176). According to one exemplary embodiment, the top gloss enhancement layer includes spherical colloidal silica, a surfactant, and little binder. More specifically, according to one exemplary embodiment, the spherical colloidal silica used to form the present top gloss enhancement layer (176) comprises individual spherical colloidal silica with particle size of ranging from 40 to 250 nm and little or no binder depending on the coat weight applied. More preferably, the colloidal particle size range is between 40 to 80 nm. According to this exemplary embodiment, the individual spherical colloidal silica that forms the top gloss enhancement layer (176) forms fewer but larger pores, when compared to the underlying duo-treated fumed silica layer (174).

According to one exemplary embodiment, the top gloss enhancing layer (176) may be formed on the duo treated silica pigment coating (174) in quantities ranging from approximately 0.2 to 0.5 gsm, resulting in a gloss enhancement layer having a thickness between approximately 0.10 to 3.0µ. According to one exemplary embodiment, the thickness range of the top gloss enhancement layer (176) is based on four considerations, namely (1) gloss, (2) color gamut, (3) ink absorptivity, and (4) humid hue shift. More specifically, for higher gamut, fast ink absorptivity and low humid hue shift for dye based image, the lower end of the above-mentioned range is preferred. For higher gloss, the higher end of the above-mentioned range is preferred.

According to one exemplary embodiment, the top gloss enhancing layer (176) may be applied in the same application pass as the silica pigment coating (174) according to a wet-on-wet application process. Specifically, the top gloss enhancing layer may be applied by any number of coating apparatuses including, but in no way limited to, a multi slot applicator, a curtain applicator, a dye applicator, or a cascade coating applicator.

Exemplary System

Figure 2:
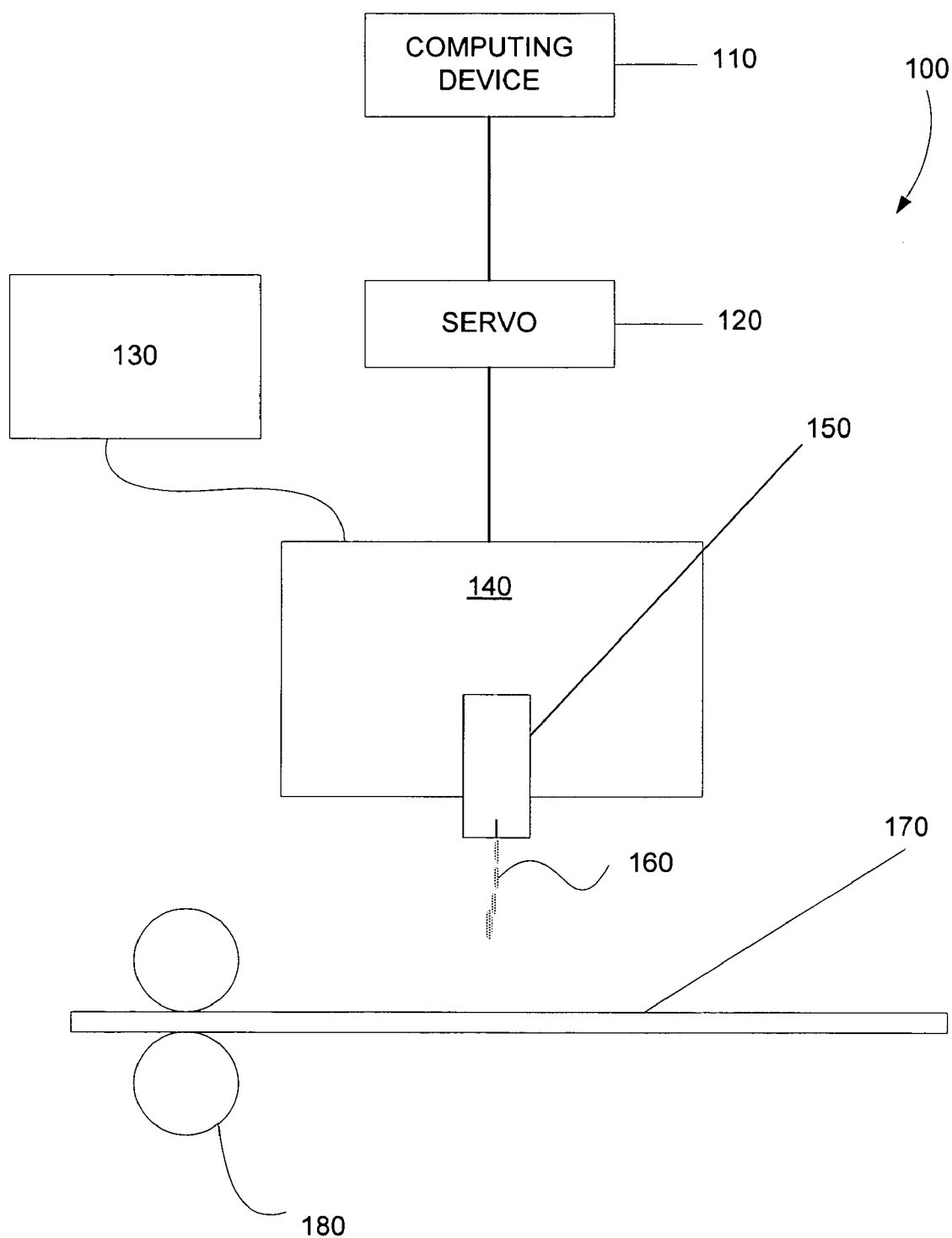
FIG. 2 is a simple block diagram illustrating an inkjet material dispensing system, according to one exemplary embodiment.

FIG. 2 illustrates an exemplary system (100) that may be used to apply an inkjet ink (160) to the above-mentioned ink receiving substrate (170), according to one exemplary embodiment. As shown in FIG. 2, the exemplary system includes a computing device (110) controllably coupled through a servo mechanism (120) to a moveable carriage (140) having an inkjet dispenser (150) disposed thereon. A material reservoir (130) may be coupled to the moveable carriage (140), and consequently, to the inkjet print head (150). A number of rollers (180) are located adjacent to the inkjet dispenser (150) configured to selectively position an ink receiving substrate (170). The above-mentioned components of the present exemplary system (100) will now be described in further detail below.

The computing device (110) that is controllably coupled to the servo mechanism (120), as shown in FIG. 2, controls the selective deposition of an inkjet ink (160) on an ink receiving substrate (170). A representation of a desired image or text may be formed using a program hosted by the computing device (110). That representation may then be converted into servo instructions that are then housed in a processor readable medium (not shown). When accessed by the computing device (110), the instructions housed in the processor readable medium may be used to control the servo mechanisms (120) as well as the movable carriage (140) and inkjet dispenser (150). The computing device (110) illustrated in FIG. 2 may be, but is in no way limited to, a workstation, a personal computer, a laptop, a digital camera, a personal digital assistant (PDA), or any other processor containing device.

The moveable carriage (140) of the present printing system (100) illustrated in FIG. 2 is a moveable material dispenser that may include any number of inkjet material dispensers (150) configured to dispense the inkjet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

As an image or text is printed on the ink receiving substrate (170), the computing device (110) may controllably position the moveable carriage (140) and direct one or more of the inkjet dispensers (150) to selectively dispense an inkjet ink at predetermined locations on the ink receiving substrate (170) as digitally addressed drops, thereby forming the desired image or text. The inkjet material dispensers (150) used by the present printing system (100) may be any type of inkjet dispenser configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. Additionally, the present ink receiving substrate (170) may receive inks from non-inkjet sources such as, but in no way limited to, screen printing, stamping, pressing, gravure printing, and the like.

The material reservoir (130) that is fluidly coupled to the inkjet material dispenser (150) houses and supplies an inkjet ink (160) to the inkjet material dispenser. The material reservoir may be any container configured to hermetically seal the inkjet ink (160) prior to printing.

FIG. 2 also illustrates the components of the present system that facilitate reception of the pigment-based inkjet ink (160) onto the ink receiving substrate (170). As shown in FIG. 2, a number of positioning rollers (180) may transport and/or positionally secure an ink receiving substrate (170) during a printing operation. Alternatively, any number of belts, rollers, substrates, or other transport devices may be used to transport and/or postionally secure the ink receiving substrate (170) during a printing operation, as is well known in the art.

According to one exemplary embodiment, the inkjet ink (160) of the exemplary system (100) illustrated in FIG. 1 includes an anionic dye colorant configured to be printed on the treated silica particulates of the ink receiving substrate (170). Though any effective amount of dye can be used in this system, the inkjet ink can include from 0.1 wt % to 10 wt % of the dye. Examples of suitable anionic dyes include a large number of water-soluble acid and direct dyes. Specific examples of anionic dyes include the Pro-Jet series of dyes available from Avecia Ltd., including Pro-Jet Yellow I (Direct Yellow 86), Pro-Jet Magenta I (Acid Red 249), Pro-Jet Cyan I (Direct Blue 199), Pro-Jet Black I (Direct Black 168), and Pro-Jet Yellow 1-G (Direct Yellow 132); Aminyl Brilliant Red F-B (Sumitomo Chemical Co.); the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), and Duasyn Acid Blue AE-SF VP344 (Acid Blue 9); mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Direct Yellow 86, Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B (Reactive Red 31), Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; mixtures thereof; and the like. This list is intended to be merely exemplary, and should not be considered limiting.

Similarly, suitable pigments can be black pigments, white pigments, cyan pigments, magenta pigments, yellow pigments, or the like. Further, pigments can be organic or inorganic particles as is well known in the art. Suitable inorganic pigments include, for example, carbon black. However, other inorganic pigments may be suitable such as titanium oxide, cobalt blue ($CoO$—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present system and method, therefore the following listing is not intended to be limiting. For example, colored pigments can be blue, brown, cyan, green, white, violet, magenta, red, orange, yellow, as well as mixtures thereof. The following color pigments are available from Cabot Corp.: CABO-JET 250C, CABO-JET 260M, and CABO-JET 270Y. The following color pigments are available from BASF Corp.: PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871K, PALIOGEN Red 3340, HELIOGEN Blue L 6901F, HELIOGEN Blue NBD 7010, HELIOGEN Blue K 7090, HELIOGEN Blue L 7101F, HELIOGEN Blue L6900, L7020, HELIOGEN Blue D6840, HELIOGEN Blue D7080, HELIOGEN Green L8730, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300. These pigments are available from commercial sources such as Hoechst Celanese Corporation, Paul Uhlich, BASF, American Hoechst, Ciba-Geigy, Aldrich, DuPont, Ugine Kuhiman of Canada, Dominion Color Company, Magruder, and Matheson. Examples of other suitable colored pigments are described in the Colour Index, 3rd edition (The Society of Dyers and Colourists, 1982).

Other pigments not specifically listed can also be suitable for use with the present exemplary system. The above-illustrated pigments can be used singly or in combination of two or more. Typically, the pigments of the present system and method can be from about 10 nm to about 10 μm and in one aspect can be from 10 nm to about 500 nm in diameter, although sizes outside this range can be used if the pigment can remain dispersed and provide adequate color properties. In one detailed aspect of the present system and method, the pigment can comprise from about 1% to about 20% by weight of the ink-jet ink composition, and often can comprise from about 2% to about 10% by weight of the ink-jet ink composition.

As mentioned, the inkjet ink compositions (160) of the present exemplary system and method are typically prepared in an aqueous formulation or liquid vehicle which can include water, cosolvents, surfactants, buffering agents, biocides, sequestering agents, viscosity modifiers, humectants, binders, and/or other known additives. Typically, the inkjet ink compositions of the present exemplary system and method have a viscosity of between about 0.8 to about 8 centipoise (cps). In one exemplary embodiment, the liquid vehicle can comprise from approximately 70 wt % to about 99.9 wt % of the inkjet ink composition. In another aspect, other than the colorant, the liquid vehicle can also carry polymeric binders, latex particulates, and/or other solids.

As described, cosolvents can be included in the inkjet compositions (160). Suitable cosolvents include water soluble organic cosolvents, but are in no way limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the inkjet to minimize clogging or other properties of the ink such as viscosity, pH, surface tension, optical density, and print quality. The cosolvent concentration can range from about 1 wt % to about 40 wt %, and in one embodiment is from about 2 wt % to about 30 wt %. Multiple cosolvents can also be used, as is known in the art.

Various buffering agents or pH adjusting agents can also be optionally used in the inkjet ink compositions of the present exemplary system and method. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the inkjet ink composition.

Additionally, various biocides may be incorporated into the present inkjet ink compositions (160) to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the inkjet ink composition and often from about 0.1 wt % to about 0.25 wt %.

In an additional aspect of the present system and method, binders can be included in the liquid vehicle of the inkjet ink which act to secure the colorants on the substrate. Binders suitable for use in the present inkjet ink compositions (160) typically have a molecular weight of from about 1000 Mw to about 3,000,000 Mw. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

If surfactants are present in the inkjet ink compositions (160), then typical water-soluble surfactants such as TRITONS™ (including ethoxylated octylphenols), IGEPALS™ (including alkyl phenoxypoly (ethleneoxy) ethanols), SILWETS™ (including silicone glycol copolymers including polyalkylene oxide-modified polydimethylsiloxanes, SURFYNOLS™ (including ethoxlyated tetramethyl decyndiols), TERGITOLS™ (including ethoxylated trimethylnonanols), BRIJS™ (including polyoxyethylene ethers), PLURONICS™ (including ethylene oxide/propylene oxide copolymers), FLUORADS™ and ZONYLS™ (including fluorosurfactants), and NEODOLS™ (including nonionic ethoxylated surfactants). Other surfactants or wetting agents that can be used include Wetting Olin10G, alkyl polyethylene oxides, alkyl phenyl polyethylene oxides, polyethylene oxide (PEO) block copolymers, acetylenic PEO, PEO esters, PEO amines, PEO amides, and dimethicone copolyols. Any of these surfactants, or combination of these surfactants or other surfactants, can be present at from 0.01 wt % to about 10 wt % of the inkjet ink composition.

EXAMPLE

The following examples illustrate the embodiments of the system and method that are presently best known. However, it is to be understood that the following are only exemplary or illustrative of the application of the principles of the present system and method. Numerous modifications and alternative compositions, methods, and systems may be devised by those skilled in the art without departing from the spirit and scope of the present system and method. The appended claims are intended to cover such modifications and arrangements. Thus, while the present exemplary system and method have been described above with particularity, the following examples provide further detail in connection with what are presently deemed to be the most practical and preferred embodiments.

According to one example, a number of silica dispersions were generated according to the above-teachings as indicated in Table 1 below. As illustrated, the dispersion procedure for the control and a number of silica dispersions were identical except for the aminoorganosilane treating agent used. As incorporated by Example 1, the molar ratio of the various aminoorganosilane treating agents used was kept at 1.2% relative to the silica.

TABLE 1

| Silica Dispersion Materials | Concentration | Amount | Dry Weight | MW | Molar Ratio |
|---|---|---|---|---|---|
| Water | 100% | 450 | | 18 | |
| ACH | 35% | 12.3 | 4.31 | 174.5 | 1.20 |
| Aminoorganosilane | x % | y | (x %) * y | MW | 1.20 |
| Carbosil M5 | 100% | 123.6 | 123.60 | 60 | 100 |
| Water | 100% | 14.1 | | 18 | |
| Solid % | | | | ~20.6% | |

According to the dispersion formulation illustrated in Table 1, a number of substitute treating agents were used as listed in Table 2 below:

TABLE 2

| Sample ID | Substitute Treating Agents | Concentration | Amount | Dry Weight | MW | Molar Ratio |
|---|---|---|---|---|---|---|
| DAA0591 (Control) | 2-AMINOETHYL-3-AMINOPROPYL TRIMETHOXYSILANE | 100% | 5.50 | 5.50 | 222 | 1.20 |
| DAD3547 | (N,N-DIMETHYLAMINOPROPYL)-TRIMETHOXYSILANE | 95% | 5.40 | 5.13 | 207 | 1.20 |
| DAD3396 | (N,N-DIETHYL-3-AMINOPROPYL) TRIMETHOXYSILANE | 95% | 6.13 | 5.82 | 235 | 1.20 |
| DAB1932 | n-BUTYLAMINOPROPYLTRIMETHOXYSILANE | 95% | 6.13 | 5.82 | 235 | 1.20 |

TABLE 2-continued

| Sample ID | Substitute Treating Agents | Concentration | Amount | Dry Weight | MW | Molar Ratio |
|---|---|---|---|---|---|---|
| DAA0610 | AMINIOPROPYLTRIETHOXYLSILANE | 100% | 5.50 | 5.5 | 221 | 1.21 |
| DAA0611 | AMINOPROPYLTRIMETHYLSILANE | 100% | 4.42 | 4.42 | 179 | 1.20 |

Once the above-mentioned dispersion formulations were formed, their properties were observed as illustrated in Table 3 below:

TABLE 3

| Sample ID | Molar Ratio | Solid % | Viscosity (time 0) | pH | Coatability | General Observation |
|---|---|---|---|---|---|---|
| DAA0591 (Control) | 1.20 | 22.07 | 76.2–79.8 cp @ 42° C. | 5.3 | Coatable | Easy to disperse. Slight yellowish in color. |
| DAD3547 | 1.20 | 22.03 | 63.0 cp @ 43.3° C. | 4.84 | Coatable | Easy to disperse. Appears whiter than control. |
| DAD3396 | 1.20 | 22.04 | 53.0–58.0 cp @ 43.9° C. | 4.78 | Coatable | Easy to disperse. Appears more brownish/yellow. |
| DAB1932 | 1.20 | 22.08 | 67.9–69.8 cp @ 43.0° C. | 4.84 | Coatable | Easy to disperse. Appears whiter than control. |
| DAA0610 | 1.21 | 22.37 | 1250 cp @ 41.5° C. | 3.49 | Coatable | Easy to disperse. Viscosity increases rapidly after finishing mixing. Dispersion is whiter than control |
| DAA0611 | 1.20 | 22.06 | 1300 cp @ 41.5° C. | 3.50 | Coatable | Easy to disperse. Viscosity increases rapidly after finishing mixing. Dispersion is whiter than control |

Each of the above silica dispersions were then used to form a number of coating formulations as detailed in Table 4 below:

TABLE 4

| Formulation | Coat wt of each component (gsm) | % |
|---|---|---|
| Silica Dispersion | 21.0 | 78.1 |
| MO4088 | 4.52 | 16.8 |
| Thio Diethylene Glycol | 0.50 | 1.9 |
| Boric Acid | 0.80 | 3.0 |
| Wet Olin (35 mg/100 g of coating mix) | 0.07 | 0.3 |
| Coating mix total solid % | 0.13 | |
| Coat wt. (gsm) | 27.0 | |

The above coating formulations were then used to coat identical photobases and were printed with identical images. Table 5 below illustrates the observed image quality and yellowing characteristics of the various coating formulations:

As illustrated by the results compiled in Table 5, the monoamine exhibits better yellowing performance than di-amino treating agent in the duo treated system. Additionally, the resultant coated paper exhibits good yellowing and coalescence performance.

In conclusion, the above-mentioned example illustrates a number of benefits that may be provided by the present exemplary system and method. More specifically, the disclosed porous ink recording material including a thin layer of silica pigments which were duo-treated with both an inorganic treating agent and a monoaminoorganosilane treating agent provide improved image gloss and quality on prints with both dye and pigment based ink, improved humid bleed and reduced blurry bleed, improved permanence, decreased yellowing, and decreased manufacturing costs.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

TABLE 5

| Performance Characteristic Sample ID | Yellowing Weeks to Failure | Coalescence Observed | Visual Inspection Cracking, Haze | Print Bleed Ranking, 1 is the best, 4 is the worse | Print Bleed Average wetted (mils) | Print Bleed Max (mils) |
|---|---|---|---|---|---|---|
| DAB1932 | 240 | Good | Good | 1 | 2.7 | 8.7 |
| DAA0591 Control | 33.3 | Good | Poor | 2 | 3.4 | 9.8 |
| DAD3396 | 180 | Good | Good | 3 | 5.1 | 14.7 |
| DAD3547 | 171.4 | Good | Good | 4 | 6.6 | 19.6 |
| DAA0610 | 100 | Good | Fair | 5 | 7.7 | 23.1 |
| DAA0611 | 100 | Good | NA | 5 | 8.0 | 20.2 |

What is claimed is:

1. Treated silica particulates for use in ink jet media coatings, comprising silica particulates surface-activated by an inorganic treating agent in an aqueous environment;
   wherein said silica particulates are reagent-modified by N-butylaminopropyltrimethoxysilane;
   wherein said inorganic treating agent comprises one of an aluminum chloride hydrate or a polyaluminum chloride.

2. An ink receiving substrate comprising:
   a photobase layer; and
   a porous coating composition formed on said photobase layer;
   wherein said porous coating composition includes duo treated silica particulates that are surface-activated by an inorganic treating agent and reagent-modified by a monoaminoorganosilane reagent, and a binder admixed with said duo treated silica particulates;
   wherein said inorganic treating agent comprises one of an aluminum chloride hydrate or a polyaluminum chloride.

3. The ink receiving substrate of claim 2, wherein said monoaminoorganosilane reagent comprises one of:
   a primary amine including 3-aminopropyltrimethoxysilane;
   a secondary amine including one of an N-methylaminopropyltrimethoxysilane, an N-ethylaminopropyltrimethoxysilane, an N-propylaminopropyltrimethoxysilane, or an N-butylaminopropyltrimethoxysilane;
   a tertiary amine including one of (N,N-diethyl-3-aminopropyl)trimethoxysilane or (N,N-dimethylaminopropyl)trimethoxysilane; or
   a quaternary amine including N-trimethoxysilylpropyl-N,N,Ntrimethylammonium chloride.

4. The ink receiving substrate of claim 2, wherein said binder comprises one of a polyvinylalcohol (PVA), a derivatized polyvinylalcohol, a copolymer of polyvinylalcohol and poly(ethylene oxide), gelatin, polyvinylpyrrolidone, or low Tg synthetic polymer latex.

5. The ink receiving substrate of claim 2, further comprising a gloss enhancing layer formed on said porous coating composition;
   wherein said gloss enhancing layer comprises spherical colloidal silica having an average particle size of between approximately 40 to 250 nm, coat weight of between approximately 0.2 to 0.5 grams per square meter and a thickness between approximately 0.10 to 3.0 microns.

6. A system for printing ink-jet images, comprising:
   a media sheet comprising:
      a photobase layer;
      a porous coating composition formed on said photobase layer in which said porous coating composition comprises:
         duo treated silica particulates that are surface-activated by aluminum chloride hydrate in an aqueous environment, said aluminum chloride hydrate having a molar ratio relative to said silica particles of between approximately 0.8% and 2.0%; said duo treated silica particulates also being reagent-modified by N-butylaminopropyltrimethoxysilane having a molar ratio relative to said silica particles of between approximately 0.5 to 5.0%;
         a polyvinylalcohol binder admixed with said duo treated silica particulates, said polyvinylalcohol having a percent hydrolysis from approximately 70 to 99%; in which said N-butylaminopropyltrimethoxysilane has a molar ratio relative to said polyvinylalcohol of approximately 1:1.0 to 1:1.25;
      wherein said porous coating composition has a pH of approximately 5.2 when coated on said photobase layer and has a coat weight of between approximately 15 grams per square meter and 40 grams per square meter and forms a layer having a thickness between approximately 15 and 50 microns; and
      a gloss enhancing layer including spherical colloidal silica formed on said porous composition coating, said spherical colloidal silica having an average particle size of between approximately 40 to 250 nm; said gloss enhancing layer having coat weight of between approximately 0.2 to 0.5 grams per square meter and a thickness between approximately 0.10 to 3.0 microns; and
   an ink jet ink having an anionic dye colorant configured for being printed on the media sheet.

\* \* \* \* \*